United States Patent
Lee et al.

(10) Patent No.: US 7,624,641 B2
(45) Date of Patent: Dec. 1, 2009

(54) VIBRATION SENSING APPARATUS AND WASHING MACHINE HAVING THE SAME

(75) Inventors: Sang-Hoon Lee, Guro-Gu (KR); Jae-Hyun Kim, Guro-gu (KR)

(73) Assignee: LG Electronics Inc., Seoul (KR)

( * ) Notice: Subject to any disclaimer, the term of this patent is extended or adjusted under 35 U.S.C. 154(b) by 119 days.

(21) Appl. No.: 11/526,691

(22) Filed: Sep. 26, 2006

(65) Prior Publication Data
US 2007/0068258 A1 Mar. 29, 2007

(30) Foreign Application Priority Data
Sep. 26, 2005 (KR) .................. 10-2005-0089539

(51) Int. Cl.
*G01H 1/00* (2006.01)
*D06F 37/42* (2006.01)
(52) U.S. Cl. .................. 73/660; 68/12.06
(58) Field of Classification Search ............. 73/660; 340/683; 68/12.06
See application file for complete search history.

(56) References Cited

U.S. PATENT DOCUMENTS 6,378,671 B1 * 4/2002 Carlson .................. 188/267.2
2004/0154351 A1 * 8/2004 Kim et al. ................. 68/12.06

* cited by examiner

*Primary Examiner*—John E Chapman
(74) *Attorney, Agent, or Firm*—McKenna Long & Aldridge LLP

(57) ABSTRACT

Disclosed is a vibration sensing apparatus and a washing machine having the same. The vibration sensing apparatus includes a variable resistor having variable resistance values according to each displacement, a displacement transmission unit interposed between the variable resistor and a vibrating body for transmitting each displacement of the vibrating body to the variable resistor, and a vibration detector for detecting each vibration of the vibrating body based upon the changes in the resistance values of the variable resistor. The vibration generated while operating the washing machine can be sensed in real time to prevent collision and noise from being generated due to excessive vibration.

10 Claims, 14 Drawing Sheets

VIBRATION SENSING APPARATUS AND WASHING MACHINE HAVING THE SAME

This application claims the benefit of Korean Application No. 10-2005-0089539, filed on Sep. 26, 2005, which is hereby incorporated by reference for all purposes as if fully set forth herein.

BACKGROUND OF THE INVENTION

1. Field of the Invention

The present invention relates to a vibration sensing apparatus and a washing machine having the same, and particularly, to a vibration sensing apparatus capable of detecting vibration using a variable resistor, and a washing machine having the same.

2. Discussion of the Related Art

In general, a washing machine, as shown in FIG. 1, includes a cabinet 10, an outer tub 20 installed inside the cabinet 10, and an inner tub 30 rotatably installed inside the outer tub 20. The cabinet 10 includes an opening 12 and a door 14 provided at a front side of the cabinet 10 for allowing access to the inner tub 30.

The outer tub 20 is formed in a cylindrical shape, one side of which is opened. Springs 22 and a damper 24 are respectively provided at upper and lower sides of the outer tub 20. The inner tub 30 having a cylindrical shape is rotatably installed in the outer tub 20. A driving motor 32 for rotating the inner tub 30 is coupled to a rear end of the outer tub 20.

The related art washing machine uses a method for controlling the driving motor 32 that includes estimating the vibration of the outer tub 20 according to rotations per minute (RPM) of the inner tub 30 without directly sensing the vibration of the outer tub 20. As a result, when excessive vibration of the outer tub 20 has not been estimated according to the RPM of the inner tub 30, unwanted collision and excess noise may occur.

SUMMARY OF THE INVENTION

Accordingly, the present invention is directed to a vibration sensing apparatus and a washing machine having the same that substantially obviates one or more of the problems due to limitations and disadvantages of the related art.

An advantage of the present invention is to provide a washing machine having a vibration sensing apparatus capable of recognizing (sensing, detecting, etc.) vibration generated during operation of the washing machine.

Another advantage of the present invention is to provide a vibration sensing apparatus capable of sensing vibration of a vibrating body having displacement more than a preset value, and a washing machine having the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a vibration sensing apparatus, comprising: a variable resistor having variable resistance values according to each displacement of a vibrating body; a displacement transmission unit interposed between the variable resistor and the vibrating body for transmitting each displacement of the vibrating body to the variable resistor; and a vibration detector for detecting vibration of the vibrating body based upon changes in the resistance values of the variable resistor.

In another embodiment of the present invention, a washing machine having a vibration sensing apparatus, comprises: a cabinet; an outer tub installed inside the cabinet; an inner tub rotatably installed in the outer tub; a driving motor for rotating the inner tub; and a vibration sensing apparatus disposed in the cabinet, the vibration sensing apparatus including a variable resistor having variable resistance values according to each displacement of the outer tub, a displacement transmission unit interposed between the variable resistor and a vibrating body for transmitting each displacement of the vibrating body to the variable resistor, and a vibration detector for detecting vibration of the vibrating body based upon changes in the resistance values of the variable resistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
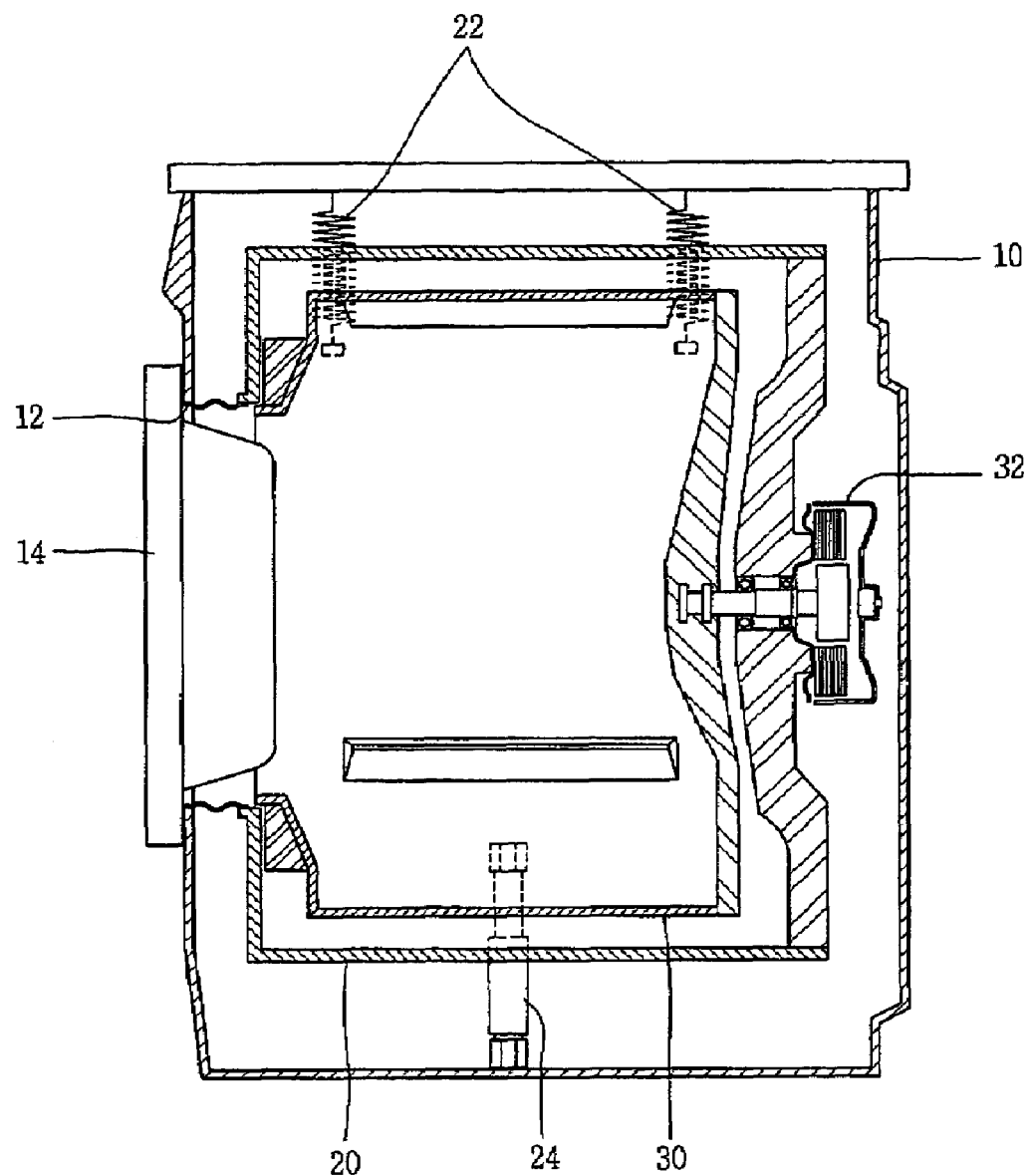
FIG. 1 is a sectional view of a side of a related art washing machine.
Figure 2:
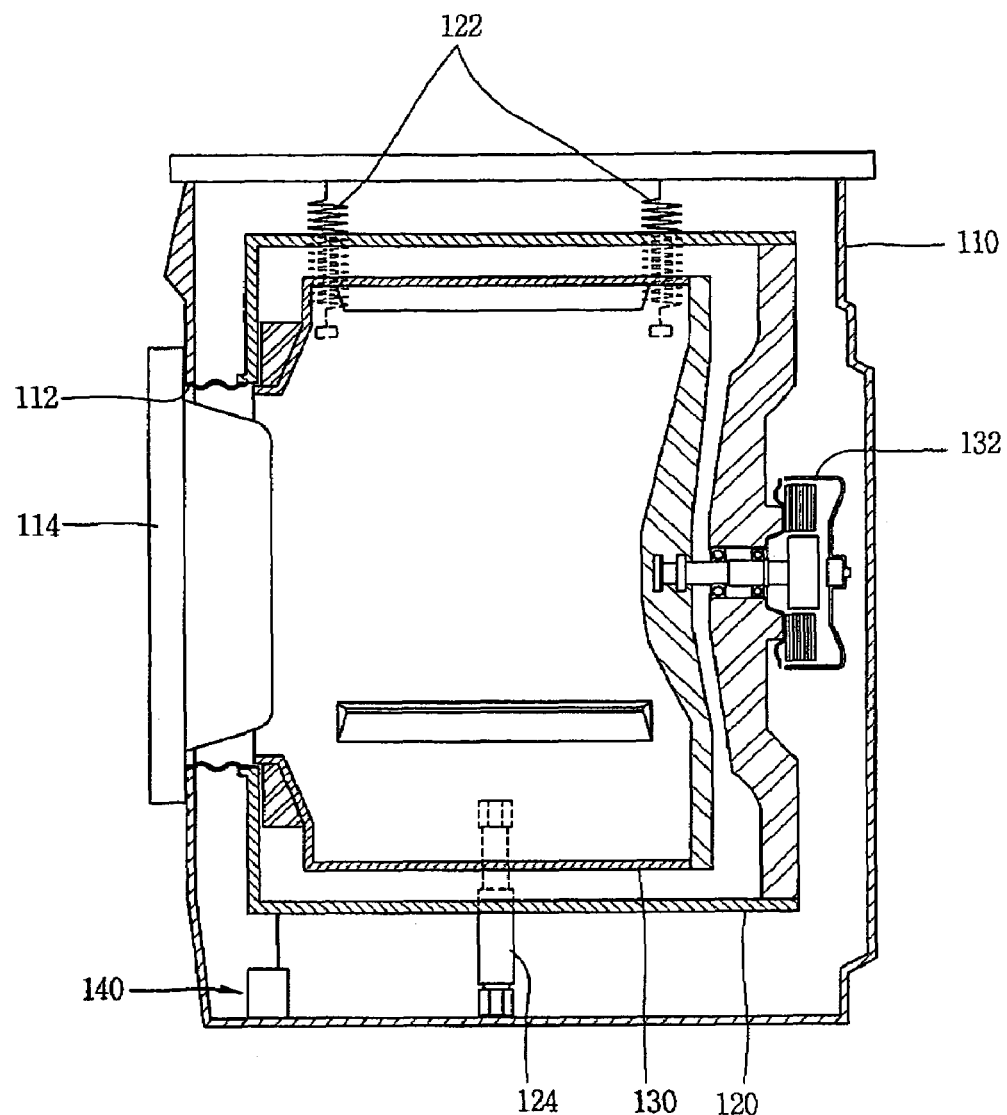
FIG. 2 is a sectional view of a side of a washing machine having a vibration sensing apparatus in accordance with a first embodiment of the present invention.
Figure 3:
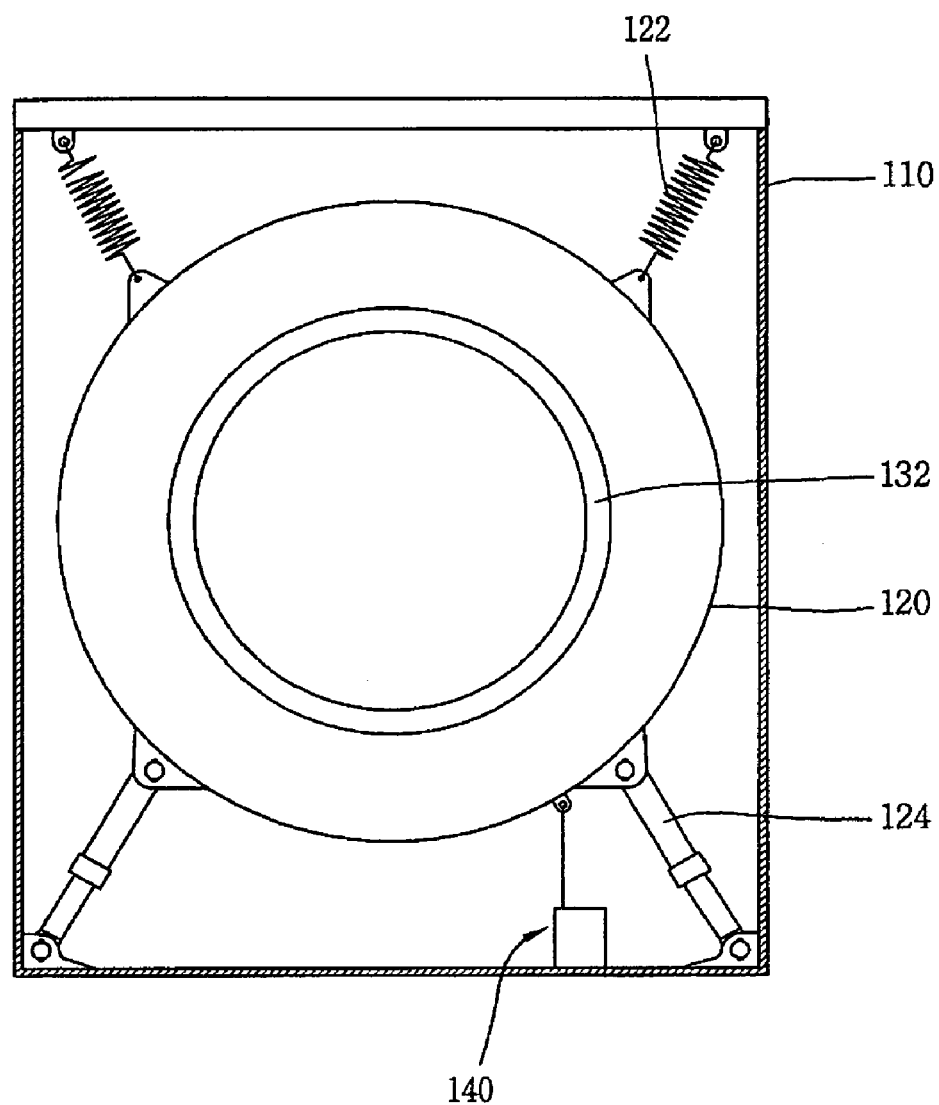
FIG. 3 is a front sectional view of the washing machine of FIG. 2.

As shown in FIGS. 2 and 3, a washing machine having a vibration sensing apparatus according to the present invention includes a cabinet 110, an outer tub 120 installed in the cabinet 110, an inner tub 130 rotatably installed in the outer tub 120, and a vibration sensing apparatus 140 for sensing vibration of the outer tub 120.

The cabinet 110 may have, for example, a rectangular shape. An opening 112 and a door 114 are provided at a front side of the cabinet 110 for allowing access to the inner tub 130. The outer tub 120 is supported by springs 122 and dampers 124 in the cabinet 110. A driving motor 132 for rotating the inner tub 130 is installed at a rear end of the outer tub 120.

Figure 4:
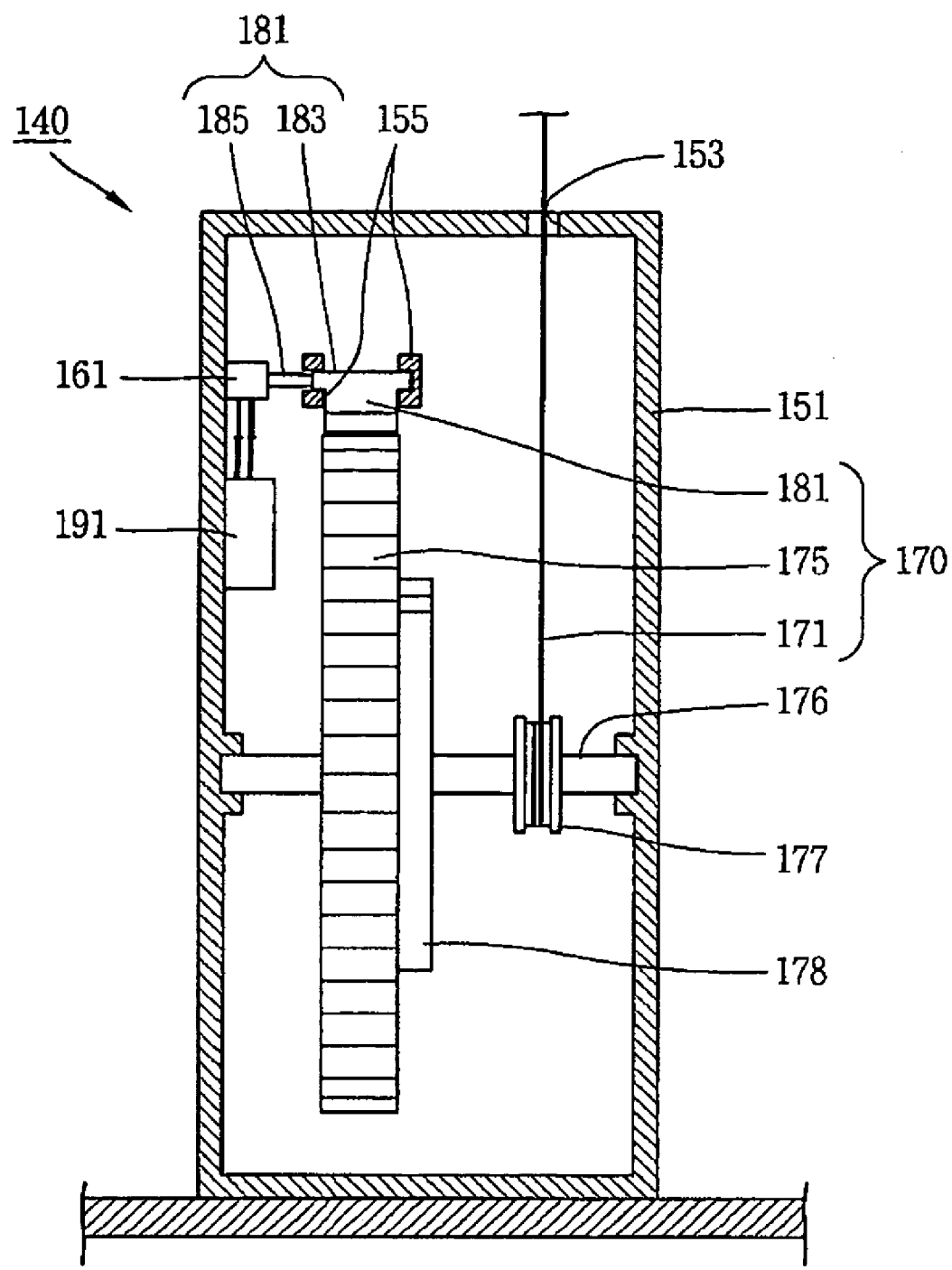
FIG. 4 is an enlarged sectional view of a side of the vibration sensing apparatus of FIG. 3.
Figure 5:
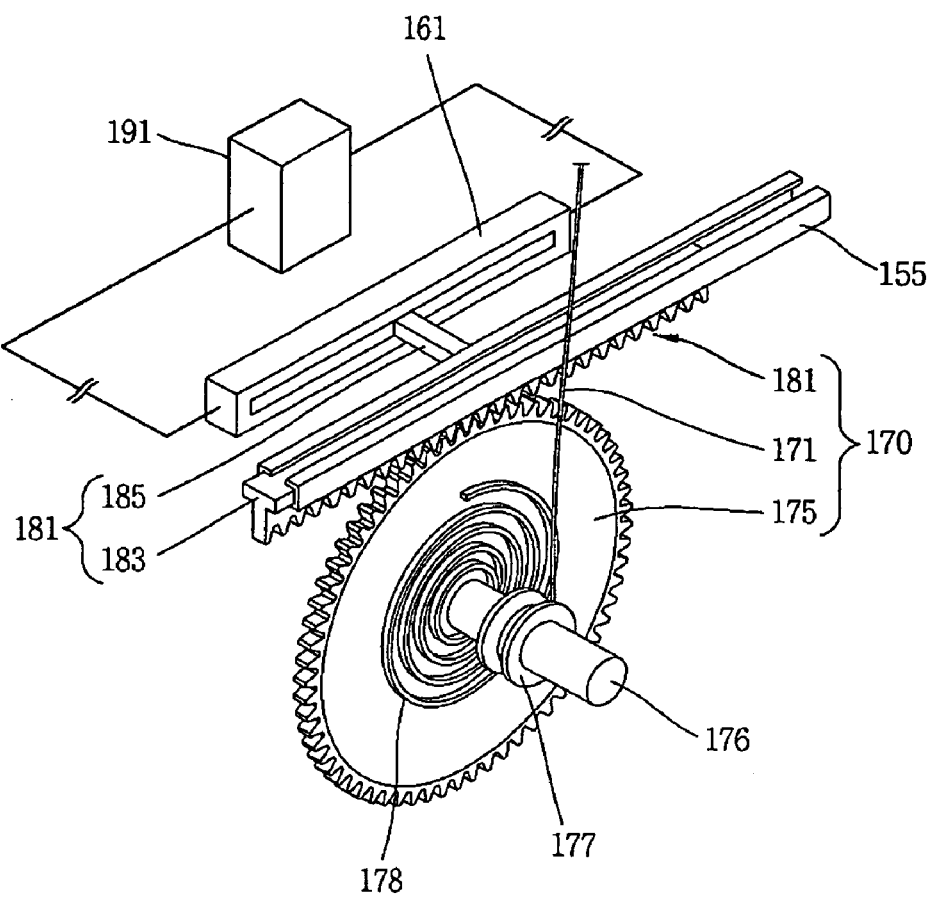
FIG. 5 is a perspective view of the vibration sensing apparatus of FIG. 4.

A vibration sensing apparatus 140 is installed, for example, at a lower side of the outer tub 120 so as to allow sensing of vibration of the outer tub 120 upon a rotation of the inner tub 130. The vibration sensing apparatus 140, as further illustrated in FIGS. 4 and 5, includes a case 151, a variable resistor 161 having variable resistance values, a displacement transmission unit 170 for transmitting each displacement of the outer tub 120 to the variable resistor 161, and a vibration detector 191 for detecting the vibration of the outer tub 120 based upon the changes in the resistance values of the variable resistor 161.

The variable resistor 161 having resistance values corresponding to the displacement of the outer tub 120 is disposed in the case 151. The vibration detector 191, which may be implemented as a circuit, is provided at one side of the variable resistor 161 to detect the vibration of the outer tub 120 based upon changes in the resistance values of the variable resistor 161. The displacement transmission unit 170 is provided at one side of the variable resistor 161 to transmit each displacement of the outer tub 120 to the variable resistor 161 when the outer tub 120 vibrates.

The displacement transmission unit 170 includes a connection member 171, one end of which is connected to the outer tub 120, a gear 175 rotated by the interaction with the connection member 171, and a displacement generator 181 for generating displacement according to the rotation of the gear 175. The connection member 171 may be implemented as a cable. The connection member 171 is preferably formed of a material which has no change in its length when extended.

The gear 175 is centered and rotated around a rotation shaft 176 which is rotatably coupled to the case 151. A winding reel 177 is coupled to the rotational shaft 176 so that the connection member 171 can be wound. A through hole 153 is formed in an upper side of the case 151 to allow the other end of the connection member 171 to pass therethrough, and one end of the connection member is fixed to the winding reel 177. An elastic member 178 is provided at one side of the gear 175 to apply an elastic force to the gear 175, thereby allowing the rotation of the gear 175 to return to its initial position. The elastic member 178 may be a spiral spring or a torsion spring. The connection member 171 is connected to the outer tub 120 to transfer the elastic force to the elastic member 178.

The variable resistor 161 may be implemented as a slide-type variable resistor such that a resistance value is varied according to a position of a moving piece while the moving piece slides with respect to the vibrating body. The displacement generator 181 includes a rack 183 linearly moved by interaction with the gear 175, and a coupling protrusion 185 for varying the resistance values by sliding the moving piece of the variable resistor 161 when the rack 183 is linearly moved. A plurality of support pieces 155 for slidibly supporting the rack 183 are formed in the case 151.

Figure 6:
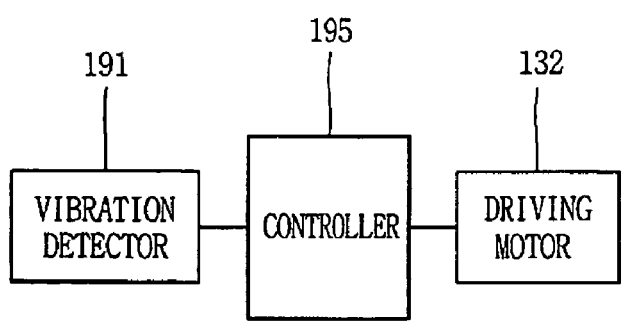
FIG. 6 is a control block diagram of the washing machine of FIG. 2.

A washing machine having the vibration sensing apparatus according to the present invention as shown in FIG. 6, has a controller 195 which may be implemented as a form of microprocessor. The controller 195 is electrically connected to the vibration detector 191 and the driving motor 132 of the vibration sensing apparatus to control the driving motor 132 based upon the vibration of the outer tub 120.

In this embodiment, when initiating the rotation of the driving motor 132, the inner tub 130 is rotated, which generates vibration. The generated vibration is sent to the outer tub 120. The vibration of the outer tub 120 is sensed by the vibration sensing apparatus 140 in real time. That is, when the outer tub 120 vibrates it actuates the connection member 171, the connection member 171 is then released from the winding reel 177 thereby rotating the gear 175. The rack 183 engaged with the gear 175 is then linearly moved. The linear movement of the rack 183 moves the coupling protrusion 185, resulting in a varying the resistance value of the variable resistor 161. As the distance between the outer tub 120 and the case 151 decreases, the tensile force of the connection member 171 is released and the gear 175 is rotated by the elastic force of the elastic member 178 in a direction opposite the direction of the rotation when the connection member 171 is actuated.

Meanwhile, the vibration detector 191 detects an amount of vibration of the outer tub 120 based upon the change in the resistance value of the variable resistor 161. If the detected amount of vibration is greater than a pre-set value, the controller 195 controls the driving motor 132 such that an RPM of the inner tub 130 is reduced or stopped, in order to reduce the amount of vibration of the outer tub 120 to below the pre-set value.

Figure 7:
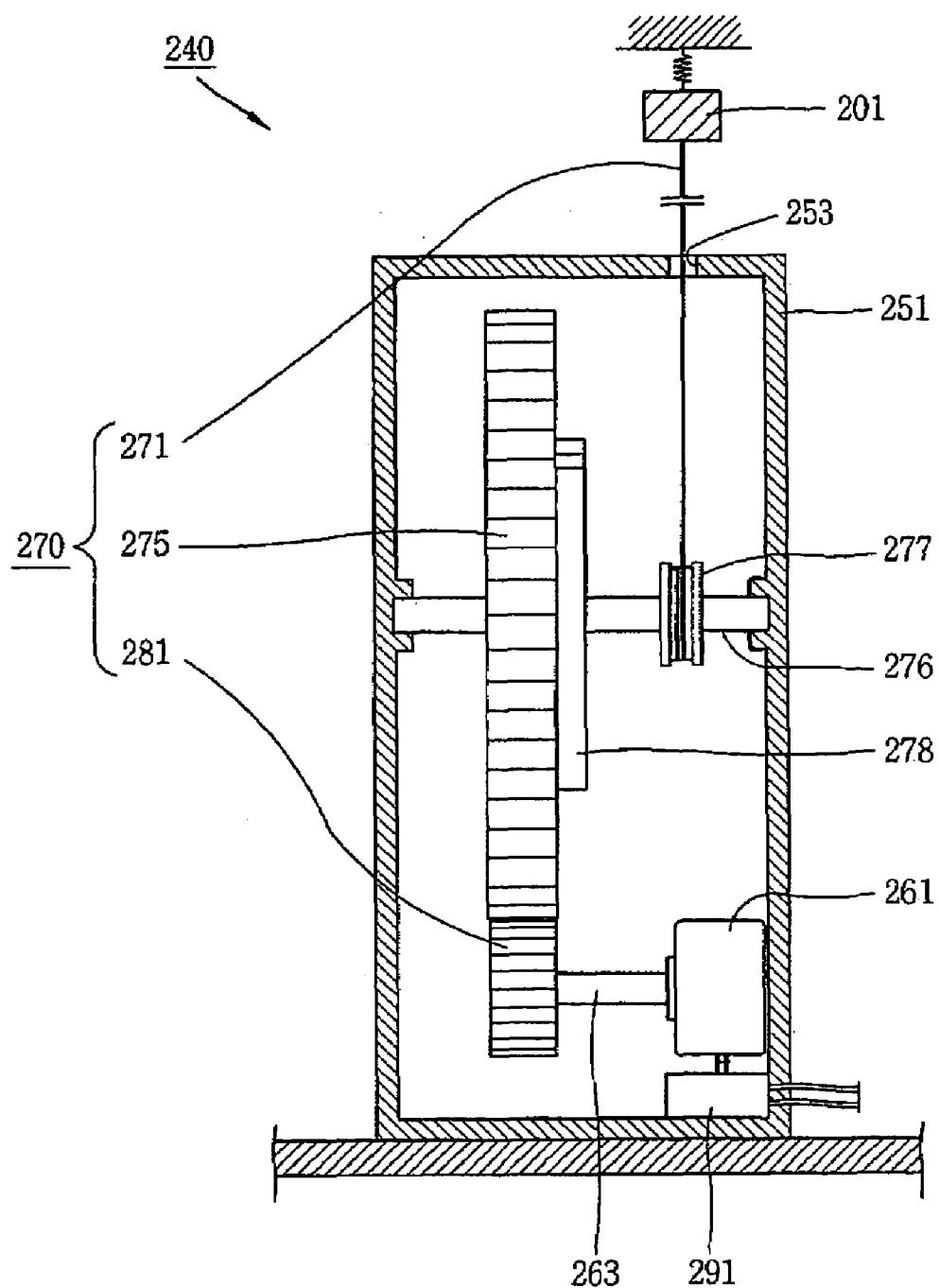
FIG. 7 is a sectional view of a side of a vibration sensing apparatus in accordance with a second embodiment of the present invention.
Figure 8:
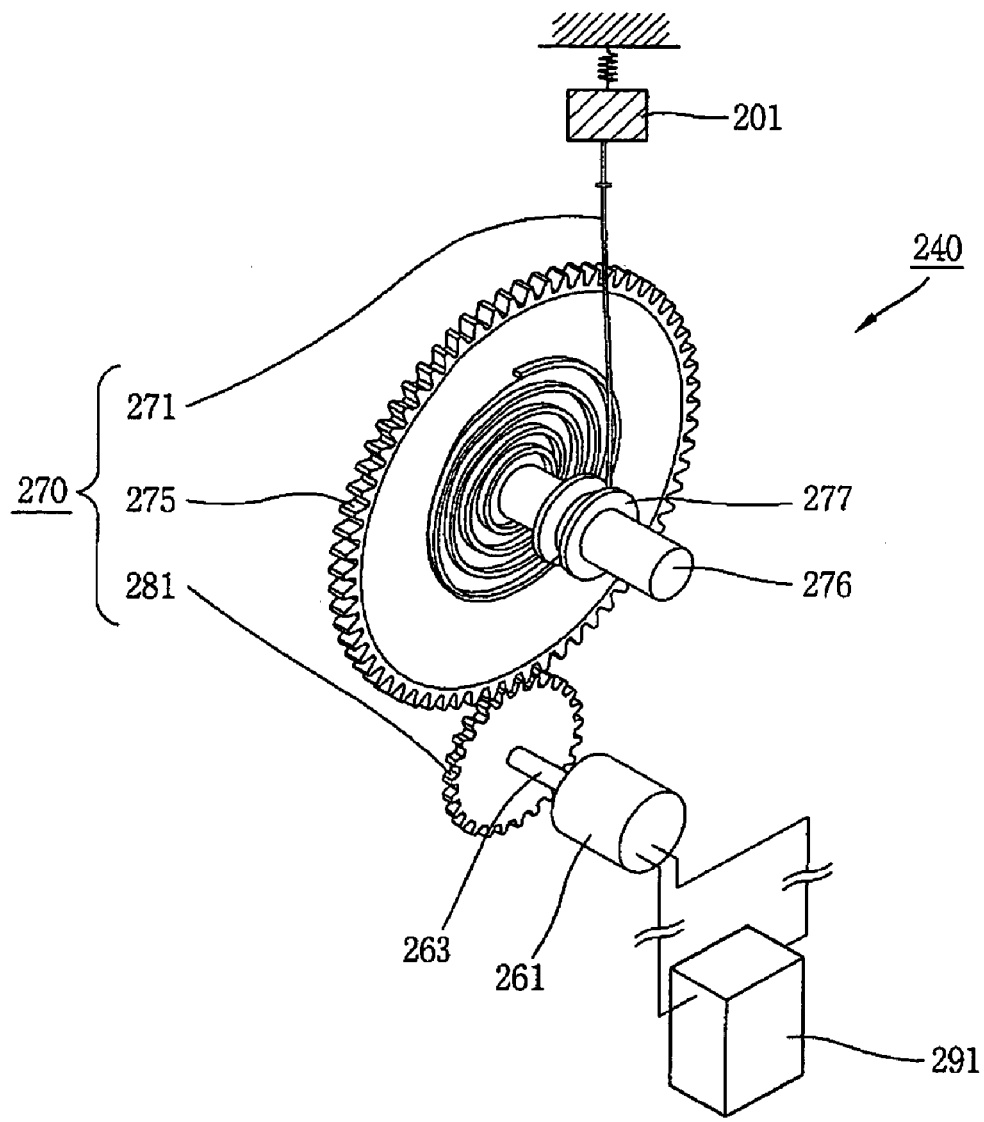
FIG. 8 is a perspective view of the vibration sensing apparatus of FIG. 7.

FIG. 7 is a sectional view of a side of a vibration sensing apparatus in accordance with a second embodiment of the present invention, and FIG. 8 is a perspective view of the vibration sensing apparatus of FIG. 7. As shown therein, a vibration sensing apparatus 240 according to the second embodiment includes a case 251, a variable resistor 261 disposed in the case 251 and having variable resistance values according to displacement of the vibrating body 201, and a displacement transmission unit 270 for transmitting each displacement of a vibrating body 201 to the variable resistor 261.

A through hole 253 is formed in one side of the case 251. The variable resistor 261 having variable resistance values according to each displacement is installed at one inner side of the case 251. The variable resistor 261 may be implemented as a rotation type variable resistor which has an input shaft 263 for rotating a moving piece with respect to a resistor. A vibration detector 291 is provided at one side of the variable resistor 261 to detect an amount of vibration of the vibrating body 201 based upon the changes in the resistance values of the variable resistor 261. The displacement transmission unit 270 is installed at one side of the variable resistor 261 to transmit each displacement to the variable resistor 261 when the vibrating body 201 vibrates.

The displacement transmission unit 270 includes a connection member 271, one side of which is connected to the vibrating body 201, a gear 275 rotated by the interaction with the connection member 271, and a displacement gear 281 connected to the input shaft 263 of the variable resistor 261 for generating each displacement of the vibrating body 201 and being rotatably engaged with the gear 275. The connection member 271 may be a cable. The gear 275 is coupled to a rotation shaft 276 which is rotatably supported to the case 251. A winding reel 277, on which the connection member 271 is capable of being wound, is coupled to the rotation shaft 276. An elastic member 278 for applying an elastic force to the gear 275 is provided at one side of the gear 275. The elastic member 278 may be, for example, a spiral spring which has one end fixed to the rotation shaft 276 and the other end fixed to the gear 275. Alternatively, the elastic member 278 may be constructed as a torsion spring. The connection member 271 is connected to the vibrating body 201 such that the elastic force accumulated in the elastic member 278 provides a force to retard the vibrating body 201.

In this embodiment, when the vibrating body 201 vibrates and moves away from the vibration sensing apparatus 240, a tensile force is applied to the connection member 271. When the connection member 271 is pulled, the connection member 271 is released from the winding reel 277. Accordingly, the gear 275 is rotated. The rotation of the gear 275 then rotates the displacement gear 281, resulting in changes in the resistance values of the variable resistor 261. The vibration detector 291 detects the amount of vibration of the vibrating body 201 based upon the changes in the resistance values of the variable resistor 261. On the other hand, when the vibrating body 201 moves away from the vibration sensing apparatus 240, the gear 275 is rotated in the opposite direction by the elastic force of the elastic member 278, to return to its original position.

Figure 9:
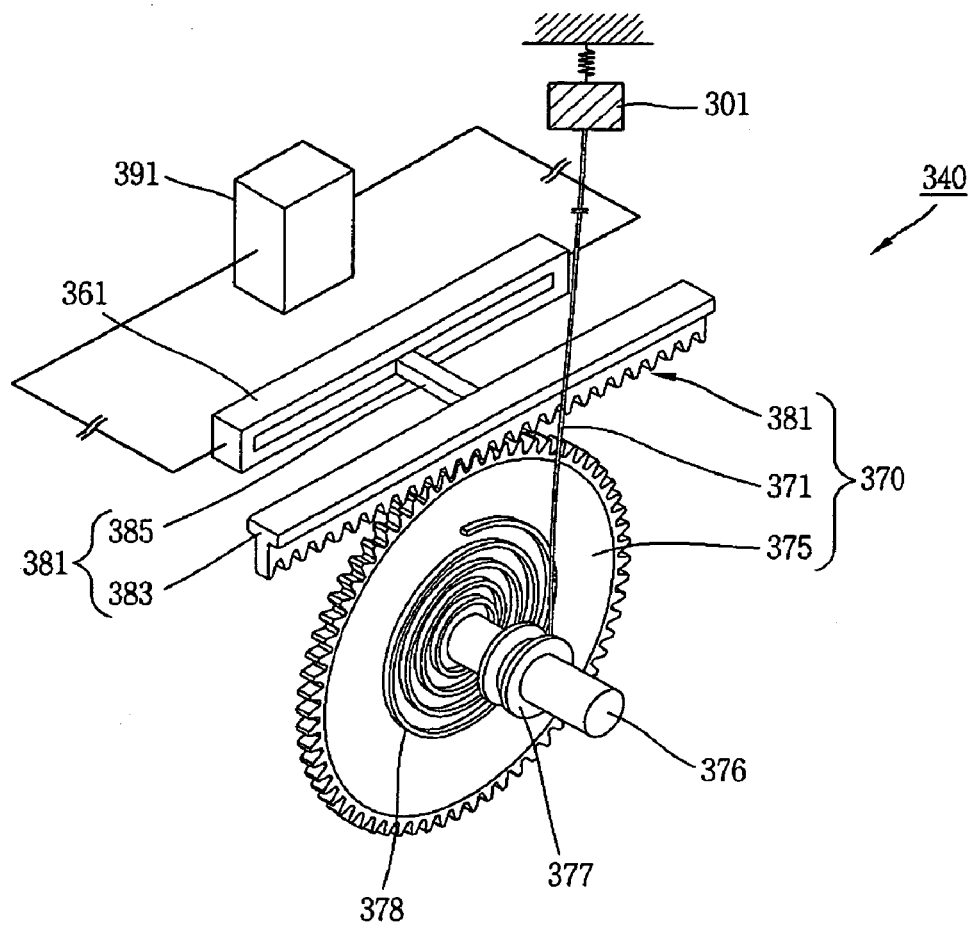
FIG. 9 is a perspective view of a vibration sensing apparatus in accordance with a third embodiment of the present invention.
Figure 10:
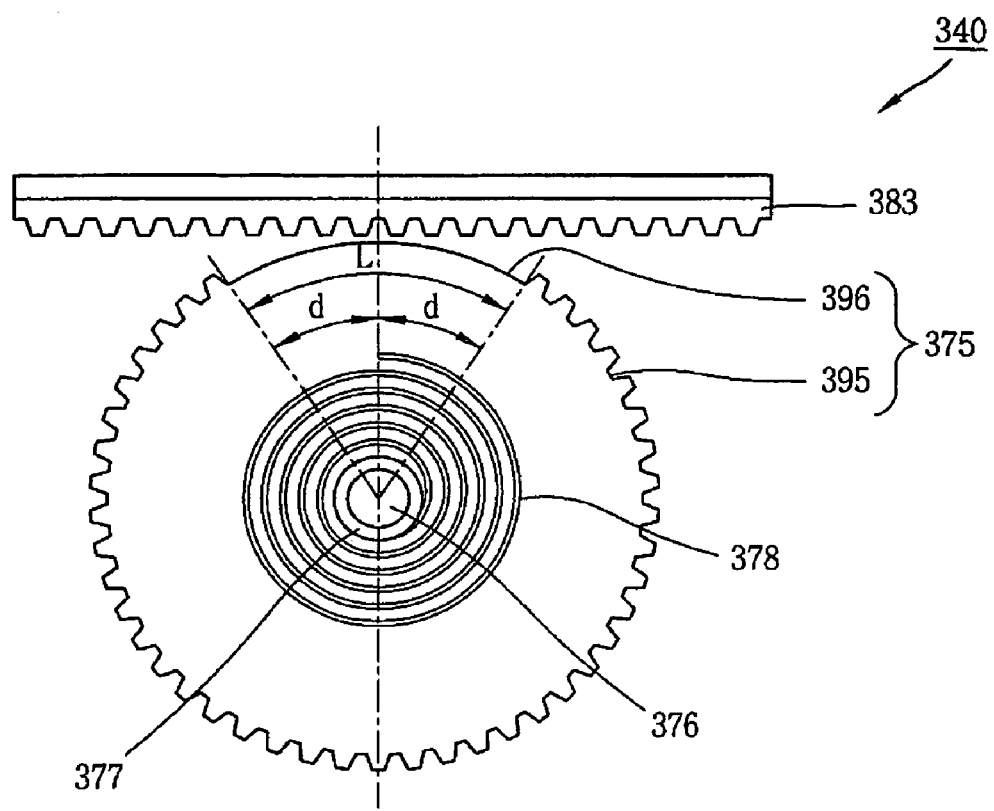
FIG. 10 is a sectional view of a side of the vibration sensing apparatus of FIG. 9.

FIG. 9 is a perspective view of a vibration sensing apparatus in accordance with a third embodiment of the present invention, and FIG. 10 is a sectional view of a side of the vibration sensing apparatus of FIG. 9. As shown therein, a vibration sensing apparatus 340 according to the present invention includes a variable resistor 361 having variable resistance values according to each displacement of the vibrating body 301, a vibration detector 391 for detecting an amount of vibration based upon changes in the resistance values of the variable resistor 361, and a displacement transmission unit 370 interposed between a vibrating body 301 and the variable resistor 361 for transmitting each displacement d of the vibrating body 301 to the variable resistor 361.

The displacement transmission unit 370 includes a connection member 371, one end of which is connected to the vibrating body 301, a gear 375 rotated by the interaction with the connection member 371, and a displacement generator 381 for generating displacement by interacting with the gear 375.

The connection member 371 may be implemented as a cable. The variable resistor 361 may be implemented as a slide type variable resistor which has variable resistance values by the sliding of a moving piece. The gear 375 is formed to be rotated based upon a rotation shaft 376. An elastic member 378 for applying an elastic force to the gear 375 is provided at one side of the gear 375 to thereby rotate the gear 375. The rotation shaft 376 is provided with a winding reel 377 on which the connection member 371 is capable of being wound.

The displacement generator 381, on the other hand, is provided with a rack 383 engaged with the gear 375 and linearly moved upon the rotation of the gear 375, and a coupling protrusion 385 formed at one side of the rack 383 for slidably moving a moving piece of the variable resistor 361.

The gear 375 is provided with a teeth portion 395 engaged with the rack 383, and a non-teeth portion 396 having a certain length L, adjacent to the teeth portion 395 so that the displacement d of the vibration body 301 cannot be transmitted to the variable resistor 361 when the displacement is less than a preset value. In this embodiment, the gear 375 is installed such that the non-teeth portion could face the rack 383 at an initial position. The length L of the non-teeth portion 396 can be adjusted to thereby enable a detection of the vibration having the displacement d greater than the pre-set value.

When the vibrating body 301 vibrates to actuate the connection member 371, the gear 375 is rotated. When the displacement d of the vibrating body 301 is smaller than a pre-set value, namely, a half length (i.e., L/2) of the full length L of the non-teeth portion 396, the teeth portion 395 of the gear 375 is not engaged with the rack 383. Accordingly, the displacement d of the vibrating body 301 cannot be sent to the variable resistor 361. Meanwhile, when the displacement d of the vibrating body 301 is greater than the pre-set value, namely, the half length (i.e., L/2) of the full length L of the non-teeth portion 396, the teeth portion 395 of the gear 375 is engaged with the rack 383 for rotation. Accordingly, the rack 383 is linearly moved. As the rack 383 is moved, the resistance values of the variable resistor 361 are changed. The vibration detector 391 can thereby detect an amount of vibration of the vibrating body 301 based upon the changes in the resistance values of the variable resistor 361.

Figure 11:
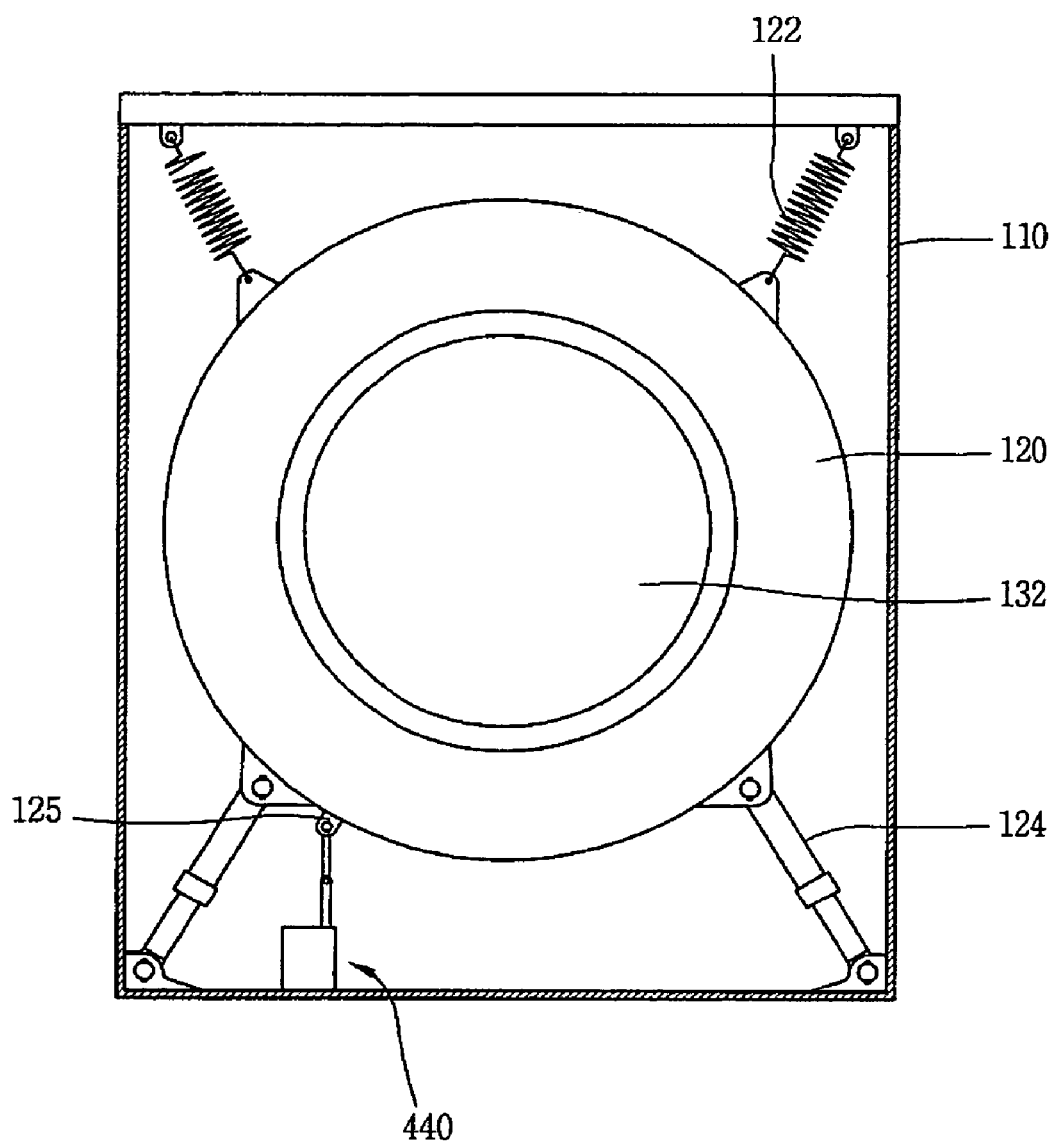
FIG. 11 is a front sectional view of a washing machine having a vibration sensing apparatus in accordance with a fourth embodiment of the present invention.
Figure 12:
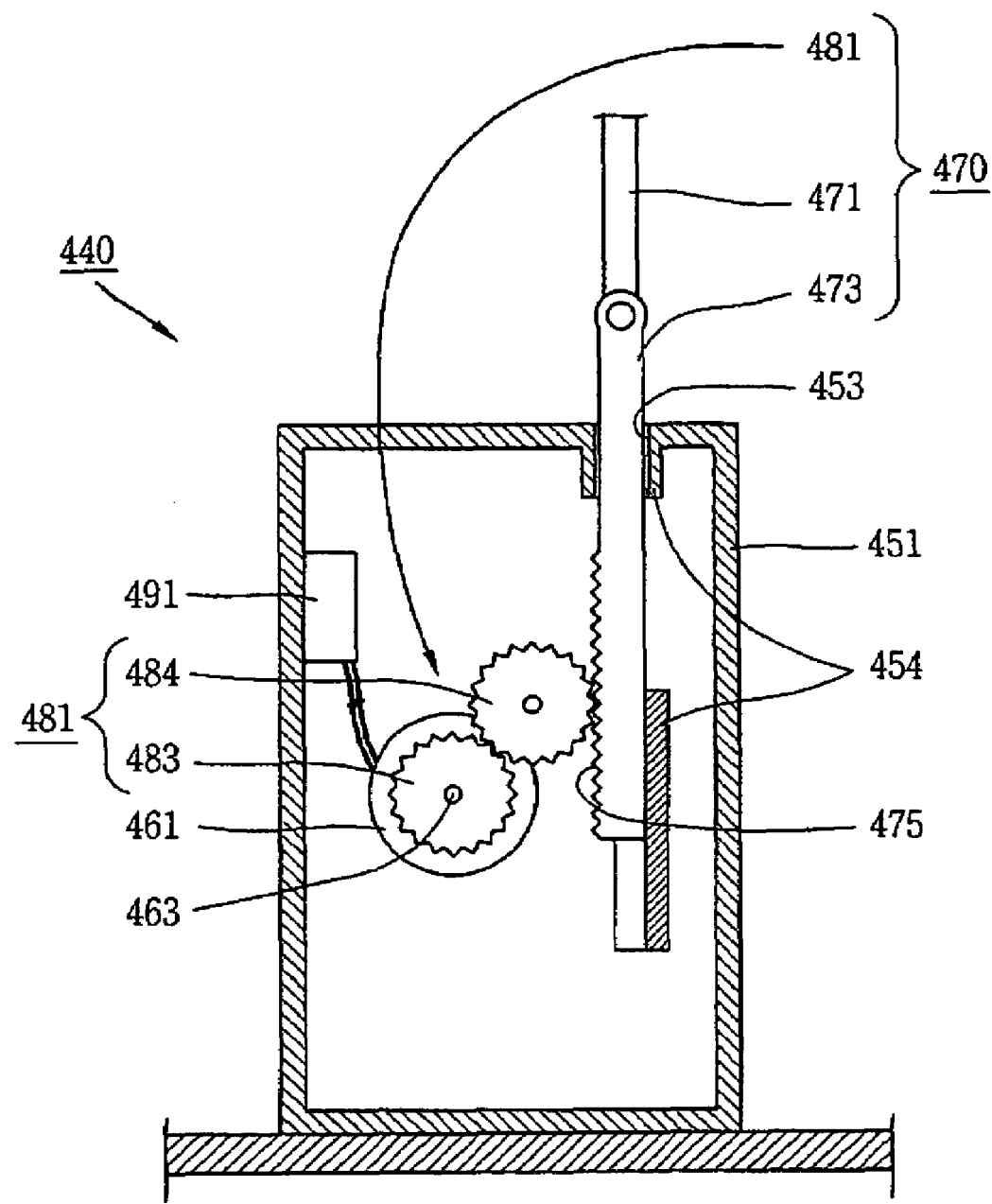
FIG. 12 is an enlarged view of the vibration sensing apparatus of FIG. 11.
Figure 13:
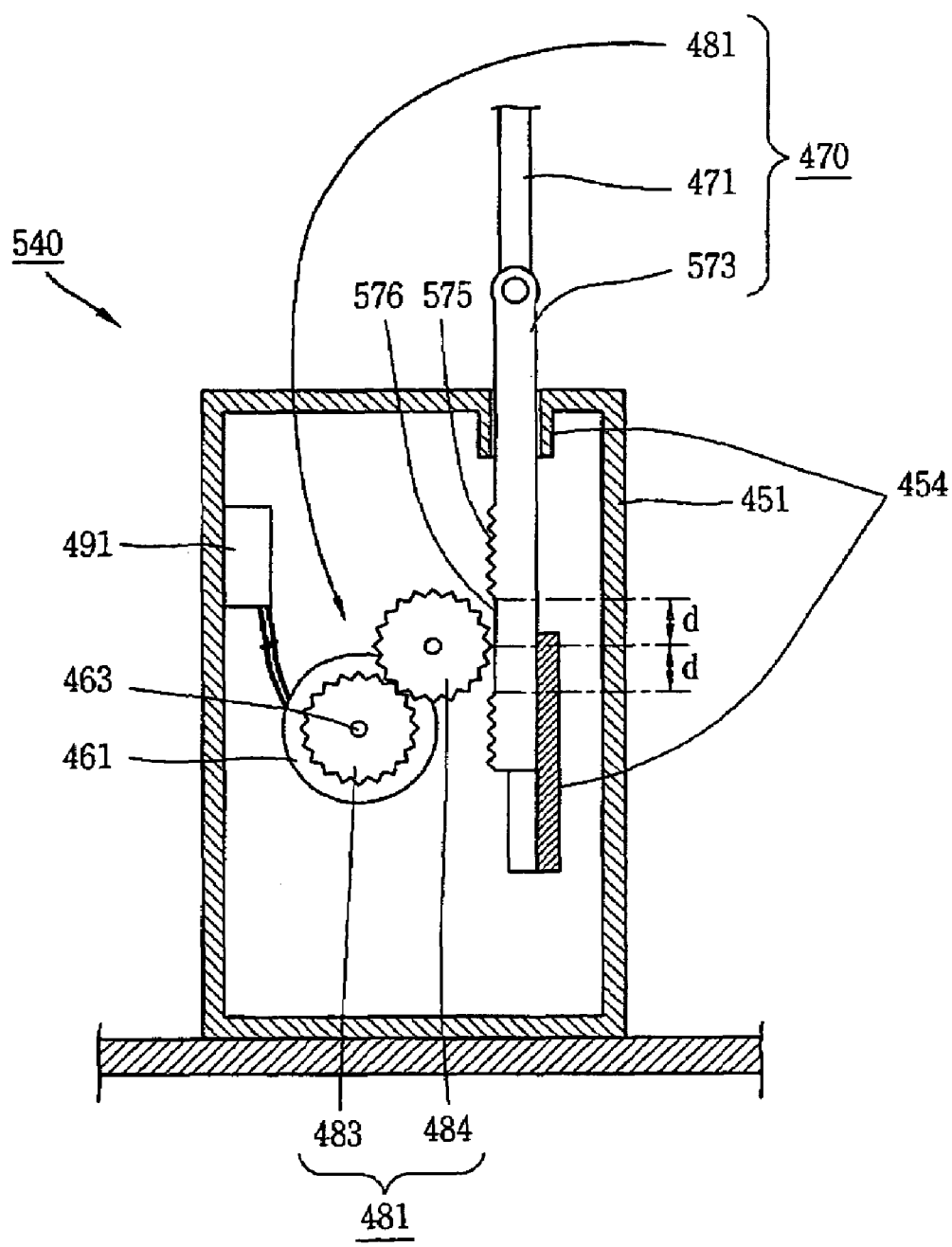
FIG. 13 is a sectional view of a side of a vibration sensing apparatus in accordance with a fifth embodiment of the present invention.

FIG. 11 is a front sectional view of a washing machine having a vibration sensing apparatus in accordance with a fourth embodiment of the present invention, FIG. 12 is an enlarged view of the vibration sensing apparatus of FIG. 11, and FIG. 13 is a sectional view of a side of a vibration sensing apparatus in accordance with a fifth embodiment of the present invention. Explanation for the same construction and the same components as the aforementioned constructions and components will not be repeated, and the same reference numerals will be employed. As shown in FIGS. 11 to 13, a washing machine having a vibration sensing apparatus according to the present embodiment includes a cabinet 110, an outer tub 120 installed in the cabinet 110, and a vibration sensing apparatus 440 for detecting an amount of vibration of the outer tub 120. The outer tub 120 is supported by springs 122 and dampers 124 in the cabinet 110.

A coupling portion 125 to which the vibration sensing apparatus 440 is connected is formed at one side of an outer surface of the outer tub 120.

As illustrated in FIG. 12, the vibration sensing apparatus 440 includes a case 451, a variable resistor 461 installed in the case 451 and having variable resistance values according to each displacement, a vibration detector 491 for detecting the amount of vibration of the outer tub 120, which is the vibrating body, based upon the changes in the resistance values of the variable resistor 461, and a displacement transmission unit 470 connected to the outer tub 120 for transmitting each displacement of the outer tub 120 to the variable resistor 461.

The variable resistor 461 may be implemented as a rotation type variable resistor 461 having an input shaft 463 for rotating a moving piece with respect to the vibrating body. The displacement transmission unit 470 is provided with a connection member 471 one end of which is connected to the outer tub 120, a slider 473 linearly moved by interacting with the connection member 471, and a displacement generator 481 for generating displacement by interacting with the slider 473.

The connection member 471 may have a bar shape formed of a rigid material for sending the displacement of the outer tub 120. One end of the connection member 471 is connected to the coupling portion 125, and the other end of the connection member 471 is connected to the slider 473. A through hole 453 is formed in one side of the case 451 to expose one side of the slider 473 to the exterior. The case 451 is provided with a guide 454 for guiding the slider 473 to allow a linear motion of the slider 473. A rack teeth portion 475 is formed at one side of the slider 473.

The displacement generator 481 is provided with a displacement gear 483 connected to an input shaft 463 of the variable resistor 461 and rotated by interacting with the slider 473, and an transmission gear 484 is rotated and engaged with the displacement gear 483 and the rack teeth portion 475.

The displacement of the outer tub 120 is transmitted to the variable resistor 461 only when the outer tub 120 vibrates with a displacement d greater than a pre-set value. As shown in FIG. 13, a vibration sensing apparatus 540 can be constructed to have a slider 573 having a non-teeth portion 576 which is formed at a portion of the rack teeth portion 575 to have a certain length L, which corresponds to two times (2d) as long as the displacement d. In another embodiment, other than forming the non teeth portion 576 at the rack teeth portion 575 shown in FIG. 13, the non teeth portion may be formed at one side of each teeth portion of the transmission gear 484 or the displacement gear 483.

In this embodiment, when the outer tub 120 vibrates, the connection member 471 is actuated. Accordingly, the slider 473 is linearly moved. The linear movement of the slider 473 rotates the transmission gear 484 and the displacement gear 483. The resistance values of the variable resistor 461 are changed accordingly. The vibration detector 491 then detects the amount of vibration of the outer tub 120 based upon the change in the resistance value of the variable resistor 461. If the amount of vibration of the outer tub 120 sensed by the vibration sensing apparatus 440 is greater than a pre-set value, the controller 195 controls the driving motor 132 such that the RPM of the inner tub 130 is reduced or stopped, thereby reducing the amount of vibration of the outer tub 120.

Figure 14:
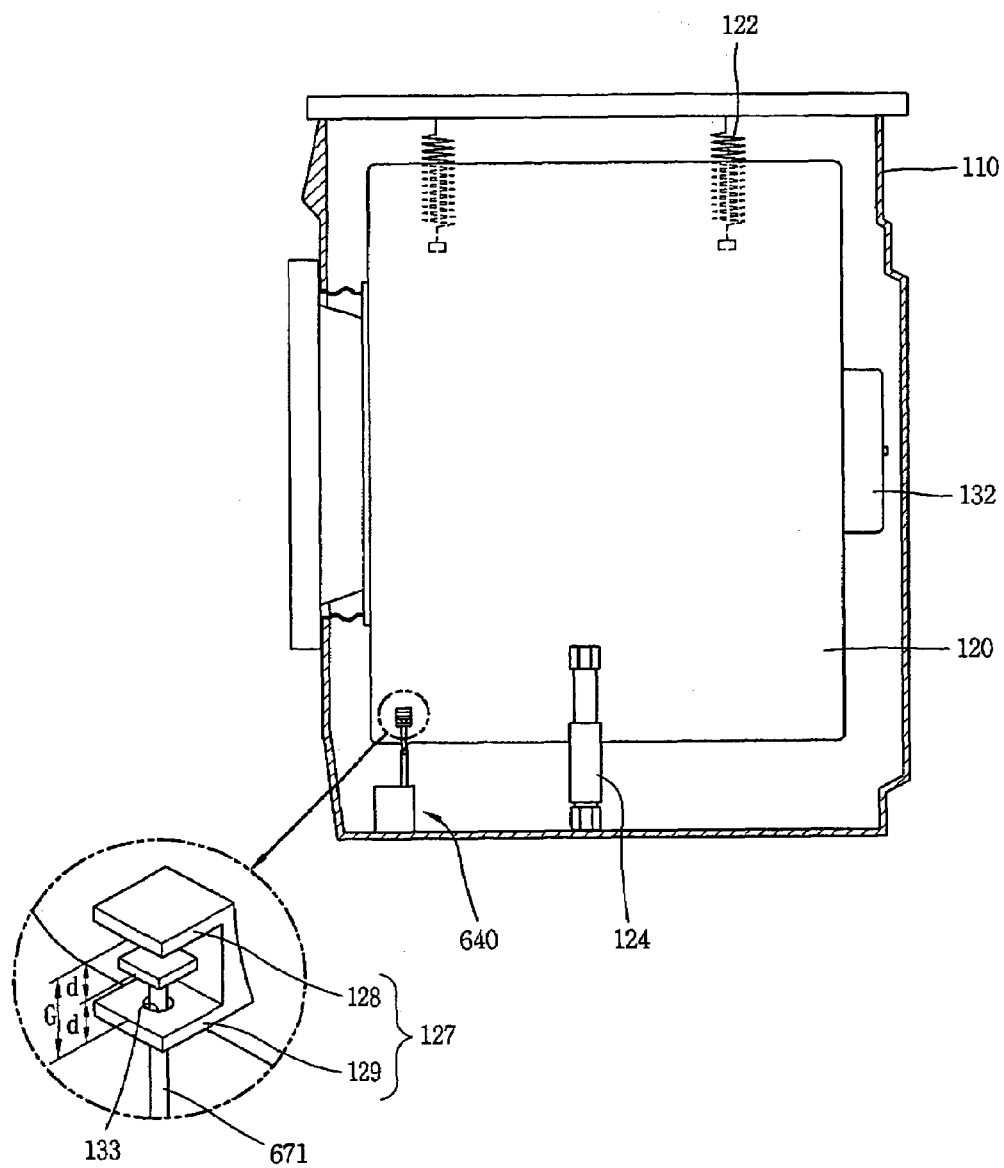
FIG. 14 is a sectional view of a side of a washing machine having a vibration sensing apparatus in accordance with a sixth embodiment of the present invention.
Figure 15:
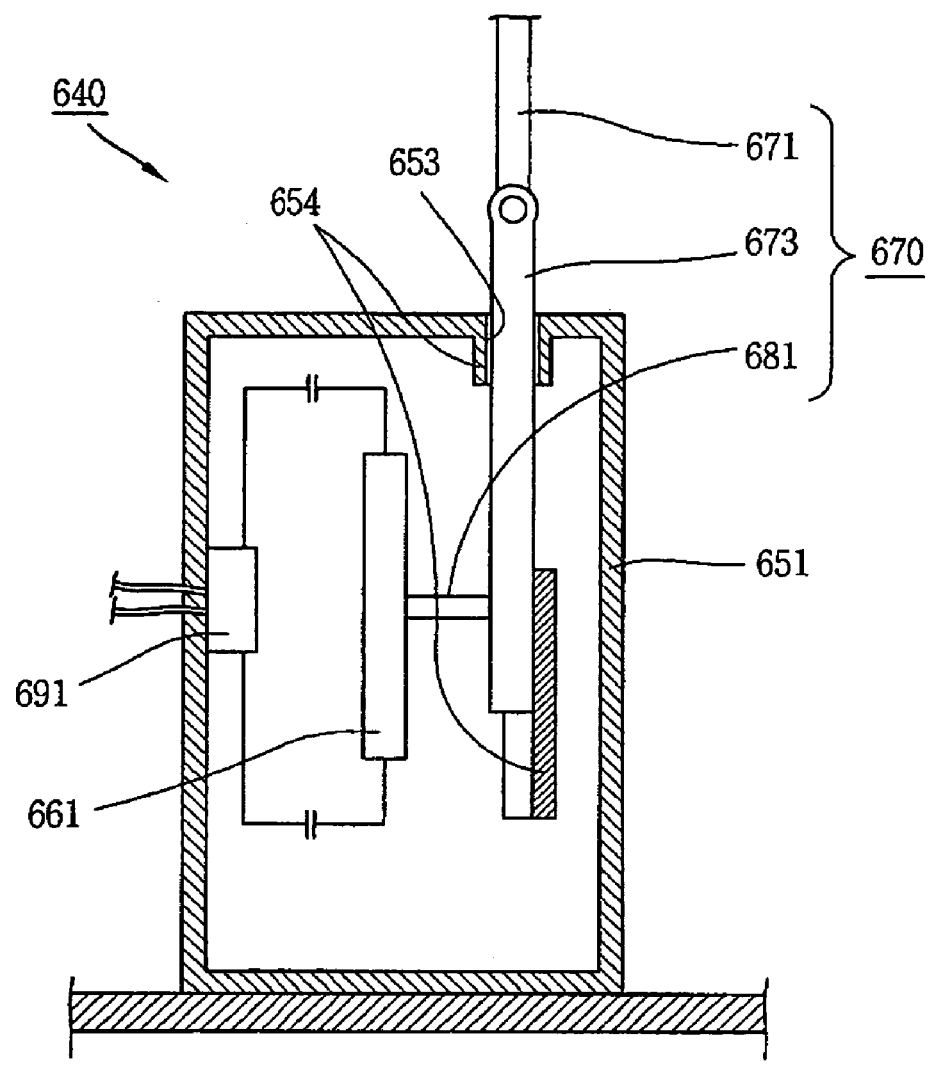
FIG. 15 is an enlarged view of the vibration sensing apparatus of FIG. 14.

FIG. 14 is a sectional view of a side of a washing machine having a vibration sensing apparatus in accordance with a sixth embodiment of the present invention, and FIG. 15 is an enlarged view of the vibration sensing apparatus of FIG. 14. As shown in FIGS. 14 and 15, a washing machine having a vibration sensing apparatus according to the sixth embodiment includes a cabinet 110, an outer tub 120 installed in the cabinet 110, and a vibration sensing apparatus 640 for detecting an amount of vibration of the outer tub 120. The outer tub 120 is supported by springs 122 and dampers 124 inside the cabinet 110.

A connection portion 127 to which the vibration sensing apparatus 640 is connected is formed outside the outer tub 120 such that the amount of displacement d of the outer tub 120 is transferred to the vibration sensing apparatus 640 when excessive vibration is generated by the outer tub 120. The connection portion 127 is provided with a pair of contact pieces 128 and 129 spaced apart from each other by a sensing gap G corresponding to a length two times as long as the displacement d, for sensing the displacement d greater than a preset value.

As illustrated in FIG. 15, the vibration sensing apparatus 640 includes a case 651, a variable resistor 661 installed in the case 651 and having variable resistance values according to each displacement of the outer tub 120, a vibration detector 691 for detecting an amount of vibration of the outer tub 120 based upon the changes in the resistance values of the variable resistor 661, and a displacement transmission unit 670 for transferring the displacement d of the outer tub 120 to the variable resistor 661. The variable resistor 661 may be implemented as a slide type variable resistor in which the resistance value is varied when the moving piece is slid with respect to the resistor.

The displacement transmission unit 670 is provided with a connection member 671 one end of which is connected to the outer tub 120, a slider 673 linearly moved by interaction with the connection member 671, and a coupling protrusion 681 for sending the displacement to the variable resistor 661 upon a linear movement of the slider 673.

The connection member 671 may have a bar shape formed of a rigid material which has a rigidity greater than a pre-set value. An upper end of the connection member 671 is extended to have a "T" shape and is positioned between the contact pieces 128 and 129. The lower contact piece 129 has an insertion hole 133 in which the connection member 671 can be inserted. A lower end of the connection member 671 is connected to the slider 673 to transfer the displacement of the outer tub 120 to the vibration sensor 640. The case 651 has a through hole 653 through which an end of the slider 673 is passed. A guide 654 for guiding the slider 673 to perform a linear motion is formed in the case 651.

According to the construction, when the output tub 120 vibrates with a displacement d less than a preset value, namely, a displacement d smaller than a distance between the upper end of the connection member 671 and both the contact pieces 128 and 129, the displacement d of the outer tub 120 is not transferred to the vibration sensing apparatus 640. Accordingly, the amount of vibration can not be detected. Contrarily, when the amount of vibration of the outer tub 120 is increased and the displacement d is greater than the pre-set value, the upper end of the connection member 671 is pulled or pressurized by the contact pieces 128 and 129. Accordingly, the slider 673 performs a linear movement, and the moving piece of the variable resistor 661 is slid by the coupling protrusion 681 to change the resistance values. The vibration detector 691 then detects the amount of vibration of the outer tub 120 based upon the changes in the resistance values of the variable resistor 661. Once detecting the amount of vibration, the controller 195 controls the driving motor 132 such that the RPM of the inner tub 130 is reduced or stopped, in order that the amount of vibration of the outer tub 120 is smaller than a pre-set value.

As described above, the present invention provides a vibration sensing apparatus capable of simplifying construction of the device, reducing fabricating costs and facilitating an ease in fabrication and installation by using the variable resistor, and the washing machine having the same.

Also, the present invention provides a washing machine having a vibration sensing apparatus capable of sending or detecting vibration generated during its operation in real time, which prevents collision and noise from being generated due to excessive vibration which has not been sensed through the RPM of the inner tub, or the like.

Additionally, the present invention provides a vibration sensing apparatus capable of sensing vibration of the vibrating body having displacement greater than a pre-set value, and the washing machine having the same.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A vibration sensing apparatus comprising:
   a variable resistor installed to be spaced from a vibrating body, and having variable resistance values according to each displacement of the vibrating body;

a displacement transmission unit interposed between the variable resistor and the vibrating body for transmitting each displacement of the vibrating body to the variable resistor; and
a vibration detector installed to be spaced from the vibrating body, and detecting each vibration of the vibrating body based upon changes in the resistance values of the variable resistor,
wherein the displacement transmission unit includes:
a connection member having one end connected to the vibrating body;
a gear mechanism rotated by interaction with the connection member; and
a displacement generator generating each displacement of the vibrating body according to rotations of the gear mechanism, and
wherein the connection member is a cable, and the displacement transmission unit further includes an elastic member for rotating the gear mechanism to an initial position.

2. The apparatus of claim 1, wherein the connection member is connected to the vibrating body and the gear mechanism for accumulating an elastic force in the elastic member.

3. The apparatus of claim 1 wherein a rotation shaft of the gear mechanism has a winding reel on which the connection member is wound.

4. The apparatus of claim 1, wherein the variable resistor is a slide type variable resistor, wherein the displacement generator includes a rack linearly moved by interaction with the gear mechanism, and a coupling protrusion for changing the resistance values of the variable resistor by interaction with the rack.

5. The apparatus of claim 4, wherein the gear mechanism includes a non-teeth portion for preventing the displacement of the vibrating body from being sent to the variable resistor when the displacement is less than a pre-set value.

6. A vibration sensing apparatus comprising:
a variable resistor installed to be spaced from a vibrating body, and having variable resistance values according to each displacement of the vibrating body;
a displacement transmission unit interposed between the variable resistor and the vibrating body for transmitting each displacement of the vibrating body to the variable resistor; and
a vibration detector installed to be spaced from the vibrating body, and detecting each vibration of the vibrating body based upon changes in the resistance values of the variable resistor,
wherein the displacement transmission unit includes:
a connection member one end of which is connected to the vibrating body; and
a slider linearly moved by interacting with the connection member,
wherein the variable resistor is a rotation type variable resistor having an input shaft, the slider includes a rack teeth portion, and the displacement transmission unit includes a displacement gear connected to the input shaft, wherein the displacement gear engages with the rack teeth portion to generate each displacement, and
wherein a non-teeth portion is at one side of the rack teeth portion and prevents the displacement of the vibrating body from being sent to the variable resistor when the displacement of the vibrating body is less than a pre-set value.

7. A vibration sensing apparatus comprising:
a variable resistor installed to be spaced from a vibrating body, and having variable resistance values according to each displacement of the vibrating body;
a displacement transmission unit interposed between the variable resistor and the vibrating body for transmitting each displacement of the vibrating body to the variable resistor; and
a vibration detector installed to be spaced from the vibrating body, and detecting each vibration of the vibrating body based upon changes in the resistance values of the variable resistor,
wherein the displacement transmission unit includes:
a connection member one end of which is connected to the vibrating body; and
a slider linearly moved by interacting with the connection member, and
wherein the one end of the connection member has a sensing gap for preventing the displacement of the vibrating body from being transferred to the variable resistor when the displacement of the vibrating body is less than the pre-set value.

8. A vibration sensing apparatus comprising:
a variable resistor installed to be spaced from a vibrating body, and having variable resistance values according to each displacement of the vibrating body;
a displacement transmission unit interposed between the variable resistor and the vibrating body for transmitting each displacement of the vibrating body to the variable resistor; and
a vibration detector installed to be spaced from the vibrating body, and detecting each vibration of the vibrating body based upon changes in the resistance values of the variable resistor,
wherein the variable resistor is a rotation type variable resistor having an input shaft, and the displacement transmission unit includes a connection member one end of which is connected to the vibrating body, and a gear mechanism rotated by interacting with the connection member,
wherein the displacement transmission unit further includes a displacement gear connected to the input shaft and rotated by interacting with the gear, and
wherein one of the gear mechanism and the displacement gear is provided with a non-teeth portion to prevent the displacement of the vibrating body from being sent to the variable resistor when the displacement of the vibrating body is less than a pre-set value.

9. A washing machine having a vibration sensing apparatus, comprising:
a cabinet;
an outer tub installed in the cabinet; and
a vibration sensing apparatus according to any of claims 1, 6, 7 and 8, disposed in the cabinet.

10. The washing machine of claim 9, further comprising:
an inner tub rotatably installed in the outer tub;
a driving motor for rotating the inner tub; and
a controller for controlling the driving motor based upon a result of the sensing performed by the vibration sensing apparatus.

* * * * *